United States Patent Office 3,508,886
Patented Apr. 28, 1970

---

3,508,886
INORGANIC ALUMINUM-FLUORINE-ALUMINUM BOND POLYMERS
Edward E. Flagg and Donald L. Schmidt, Midland, Mich., assignors to The Dow Chemical Company, Midland, Mich., a corporation of Delaware
No Drawing. Filed Apr. 3, 1967, Ser. No. 627,860
Int. Cl. C01f 7/52
U.S. Cl. 23—365           9 Claims

ABSTRACT OF THE DISCLOSURE

This invention is concerned with novel inorganic polymers based on aluminum and fluorine wherein there is aluminum-fluorine-aluminum bonding. The polymers are prepared by reacting an aluminum source material, e.g. an alane, substituted alane, aluminum alkyl or substituted aluminum alkyl with hydrogen fluoride.

---

The work leading to the present invention was carried out in connection with a contract with the Office of Naval Research.

BACKGROUND OF THE INVENTION

The present invention is related to inorganic polymers and more particularly is concerned with novel aluminum-fluorine-aluminum bond containing tractable polymers and to a method for their preparation. The term "inorganic polymers" as used herein is in accordance with the generally accepted definition which defines such materials as not containing any carbon in the polymer backbone, i.e. chain.

To date, the most widely known inorganic polymers are the silicones which are based on linear chains of alternating silicon-oxygen bonds.

Additionally, network structures of aluminum-oxygen-phosphorus have been prepared by the reaction of orthophosphoric acid and aluminum oxide (H.H. Greger, U.S. 2,460,344; Callis et al., Chem. Revs. 54, 777 (1954). The product of reaction from these components is a viscous fluid which can be dried to an amorphous material believed to be a three-dimensional network of Al—O—P chains. These phosphate materials have been used as insulating coatings and as binders (Eubanks et al., NASA Tech. Note D–106, November 1959). Also, they are alleged to have some application at temperatures up to 3500° F.

Several papers have been presented reporting attempts to prepare polymer chains which include aluminum, oxygen and phosphorus atoms. One is directed to the reaction of butylmethyl phosphonochloridate with aluminum tributoxide (Andrianov et al., J. Polymer Sc., 30, 513 (1958)). A second paper by the same authors is directed to the reaction of aluminum isopropoxide with dialkyl esters of methylphosphonic acid (Andrianov et al., Izv. Akad. Nauk SSSR, Otd. Khim. Nauk, 1753 (1962); C.A. 58, 7965.) Also, the reaction of aluminum isopropoxide with trialkyl esters of phosphonic acid has been published (Andrianov et al., Izv. Akad. Nauk. SSSR, Ser. Khim., (9) 1960 (1963); C.A. 58, 15165).

However, the products resulting from the reactions carried out by Andrianov et al. all had low degrees of polymerization and mixtures were obtained in substantially all of the preparations.

Additionally phosphorus-oxygen-metal double-bridged polymers of structures corresponding to

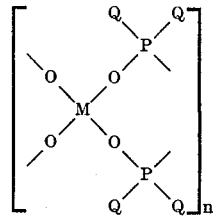

have been reported (Block et al., J. Am. Chem. Soc. 84, 3200 (1962); Crescenzi et al., J. Am. Chem. Soc. 87, 391 (1965); Montermoso, Rubber Chem. Technol., 34, 1521 (1961)). M is a metal and Q represents organic aliphatic or aryl groups. In these compositions the metal M is tetrahedral in configuration having two primary valence bonds and two coordination bonds; zinc (II) and cobalt (II) specifically are discussed as the metals employed. The polymers reported in the journal articles listed directly hereinbefore are prepared by reacting a divalent metal chloride, such as zinc (II) chloride and cobalt (II) chloride, and phosphinic acids.

It also is known that the lattice of crystalline aluminum fluoride ($AlF_3$) consists of Al—F—Al bridged bonds where each aluminum atom is bonded to six fluorine atoms giving an intractable three dimensional network ("The Nature of the Chemical Bond," L. Pauling, Cornell University Press, 1960, pp. 71–72).

Further, other reported fluoroalanes, i.e. $C_2H_5AlF_2$, have been shown to be intractable like $AlF_3$ (Ziegler et al., Annalen Chemie, 6081 (1957) and hydrolytically very unstable, i.e. dialkyl fluoroalane, (Laubengayer et al., J. Inorg. Chem., 5, 503 (1966)).

The present invention comprises reacting hydrogen fluoride with a metal source material in an inert solvent at a maximum temperature of about room temperature and ordinarily at a maximum of about zero degrees centigrade; the metal constituent of the source material is characterized as being capable of forming stable stoichiometric hydride or alkyls and also capable of forming strong fluorine bonds. The metal source material reactant usually is employed as the metal hydride substituted hydride alkyl or substituted alkyl or an adduct compound of these materials. Aluminum source materials are preferred. In this process the coresponding solid metal-fluorine-metal linked polymeric product can precipitate directly on the reaction medium or can be recovered from solution by removal of the solvent or carrier liquid.

Alanes (aluminum hydrides), substituted alanes or aluminum alkyls or substituted aluminum alkyls corresponding to the general formula $XAlR_2$ wherein X is hydrogen, phosphinate, phosphonate, alkoxide having a total carbon content of from 1 to about 20, halide and the like blocking groups and R is either hydrogen or a saturated alkyl group having a total of from 1 to about 20 carbon atoms are preferred metal source materials. The aluminum-fluorine-aluminum polymers are characterized in that the aluminum in the polymeric configuration exhibits an effective coordination number of 5 or 6.

It is a principal advantage of the present invention to provide novel relatively long-chain, tractable inorganic polymers suitable for use at temperatures higher than applicable with organic polymers now available.

The present novel polymers are particularly suitable for use as surface coatings, heat shields, thickening agents and the like particularly in applications requiring heat stability at elevated temperatures in that these do not decompose or detrimentally degrade even at high temperatures.

DESCRIPTION OF THE PREFERRED EMBODIMENTS

More particularly the novel polymer of the present invention is prepared by reacting an alane, substituted alane, aluminum alkyl or substituted aluminum alkyl as described hereinbefore with hydrogen fluoride in an inert solvent or carrier liquid, usually tetrahydrofuran, at a temperature of about minus 70° C. In this process, usually a small excess of the hydrogen fluoride above that required stoichiometrically for preparation of a predetermined embodiment of the polymer product is employed.

Alkoxide groups suitable for use in the present invention are those corresponding to the formula —$OR_a$ where $R_a$ is an aliphatic, aryl, halogen substituted aliphatic, or substituted alkyl aryl group having a total of from 1 to about 20 carbon atoms.

The phosphonates suitable for use in the present invention are derived from phosphonic acids [R'OP(OH)$_2$], depicted structurally as

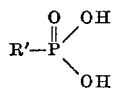

and the phosphinates are derived from phosphinic acids [R"R'"OPOH], depicted in structural form as

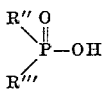

Those phosphonates and phosphinates which ordinarily are employed in the practice of the present invention are from the corresponding acids wherein R', R" and R'" are aliphatic alkyl, aryl, and alkaryl groups or the corresponding substituted groups, e.g. halogen substituted wherein the number of carbons present in each of the R', R" and R'" groups ranges from 1 to about 12. Examples of suitable phosphonic and phosphinic acids for use in the practice of the present invention are phenylphosphonic acid

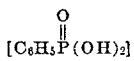

methylphosphonic acid

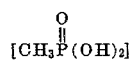

diphenylphosphinic acid

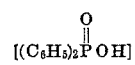

n-butylphosphonic acid

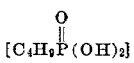

n-octylphosphonic acid

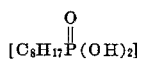

di-n-dodecylphosphinic acid

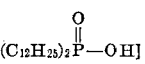

di-n-hexylphosphinic acid

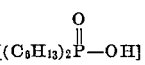

and the like.

Ethers ordinarily are employed as the solvent or carrier liquid for the reactants. Diethyl ether, n-dipropyl ether, iso-dipropyl ether, tetrahydrofuran (THF) and the like are examples of suitable solvent materials. Tetrahydrofuran is preferred. The listed solvents are particularly useful since the aluminum-fluorine-aluminum linked polymer, as formed, can precipitate directly in the reaction medium or the solvent or carrier can be readily removed therefrom by distillation or evaporation at reduced pressure.

The actual preparation of the preferred embodiment of the present novel polymer is carried out by agitating a tetrahydrofuran solution of an aluminum source material reactant at a predetermined temperature. Conveniently, an acidic fluoride source material, usually hydrogen fluoride, is added slowly to the cold stirred solution of the aluminum source material over a period of time. Usually, to assure completion of the reaction, the reaction mixture is stirred or agitated for an additional period of time, e.g. from several minutes up to an hour or more following the completion of the mixing of the reactants.

The relative amounts of aluminum source material and fluoride source material to be employed are such that the fluoride ranges from about 95 to about 105 weight percent of that required stoichiometrically for reaction with the R group of the alane, or alkyl. Preferably about stoichiometric amounts of the high purity reactants are employed to assure the optimum in molecular weights of the polymer product.

The solution concentrations to be used are not critical. Maximum concentrations ordinarily are those such that the reactant is completely dissolved therein at the operating conditions. Extremely dilute solutions are somewhat undesirable in that they are unwieldy to handle, require large storage and processing equipment and can make the separation of the solid product a time-consuming operation. For most operations, reactant solutions ranging in concentration from about 0.001 to about 0.1 molar with respect to the reactant solutes are used.

For optimum product yield and purity, all processing operations, including the initial solution preparation, are carried out in a substantially anhydrous, inert atmosphere, e.g. nitrogen or argon. Also, all reactants and solvents preferably are dried so as to be substantially anhydrous prior to use in the process.

By preselecting the aluminum source material and acidic fluoride from those operable materials disclosed herein, it is an unexpected advantage of the present invention that polymeric products of specific composition and characteristics can be prepared.

In general, the polymer is believed to be prepared in one of four configurations, these being structurally designated as follows:

Type (A)

Type (B)

Type (C)

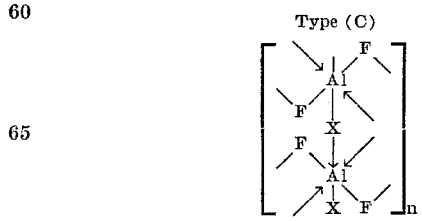

Type (D)

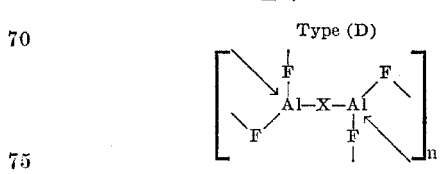

In the depicted formulas for these polymer configurations, the group designation X is as indicated hereinbefore. The letter $n$ represents an integer greater than 1.

If the substituent X participates in secondary inter- or intramolecular bonding, i.e., embodiments Type (B) or Type (C), then the effective coordination number of the aluminum is 6. If substituent X does not form a bridged bond, the coordination number of aluminum normally is five.

The following examples will serve to further illustrate the present invention but are not meant to limit it thereto.

Example 1

In a dry box, about 0.01 gram mole of isopropylalane, $(CH_3)_2CHOAlH_2$, was placed in a three-neck one liter flask and about 500 milliliters of tetrahydrofuran added thereto. (The isopropyl alane readily is prepared by mixing aluminum isopropylate, $Al[OCH(CH_3)_2]_3$, and aluminum hydride diethyl etherate, $(AlH_3)_3 \cdot O(CH_2H_5)_2$ in 1:2 molar proportions.) The flask was removed from the dry box and attached to a nitrogen gas inlet to prevent the ingress of moisture.

The vessel was fitted with a magnetic stirring bar and placed in a Dry Ice-acetone cooling bath. This cooled and maintained the reactants at a temperature of about minus 70° C.

A hydrogen fluoride generator, consisting of a Monel metal reaction tube, nitrogen gas inlet, and polyethylene dip tube, was charged with a 0.025 gram mole of sodium bifluoride ($NaHF_2$) pellets. This quantity is a small excess of that required for stoichiometric reaction with the substituted alane. The generator was attached to the reaction flask.

The reaction mass was agitated and hydrogen fluoride, generated by heating the Monel metal tube with a Bunsen burner, passed therein. The reaction of the alane with the hydrogen fluoride was rapid as indicated by an initial turbidness and evolution of hydrogen. After the generation of hydrogen fluoride was complete, the system was purged with a slow stream of nitrogen and allowed to warm slowly to room temperature. The resulting clear product solution was placed in a dry box, filtered and the solvent removed from the filtrate by evaporation at reduced presure.

A white solid of low crystallinity was obtained. Product yield was quantitative for a polymer having a monomeric unit of an isopropoxy difluoralane having about 0.5 molecule of tetrahydrofuran attached thereto and corresponding to the empirical formula $$(CH_3)_2CHO\text{---}AlF_2 \cdot (C_4H_8O)_{0.5}$$

The white solid product did not melt at temperatures as high as 400° C.

The polymer readily dissolved in tetrahydrofuran but exhibited a low solubility in benzene and in water.

Molecular weight determination carried out in a tetrahydrofuran solution indicated a degree of polymerization of fourteen; i.e. fourteen repeating monomeric units in a given polymer chain.

Elemental chemical analysis gave Al 16.99%; H 6.90%; C 37.0%; F 23.5%. Calculated values for a polymer having a monomeric unit as set forth hereinbefore are Al 16.84%; H 6.92%; C 37.5%; F 23.7%. This analysis shows that the polymer product as recovered from the reaction mass was of a high purity.

Example 2

Following the same general procedure as described for Example 1, about 0.013 gram mole of aluminum hydride diethyl etherate was dissolved in 500 milliliters of tetrahydrofuran. This solution was cooled to about minus 20° C. and about 0.027 gram mole of hydrogen fluoride added thereto. Hydrogen gas evolution was observed and a white precipitate formed in the reaction vessel. This solid product was collected on a filter in a dry box and any residual exces solvent associated therewith removed under a reduced pressure.

The product was found to be amorphous when subjected to X-ray diffraction analysis.

It exhibited a low solubility in polar organic solvents such as beta,beta-dimethoxy diethyl ether (commonly referred to as diglyme). Because of its low solubility, molecular weight determinations could not readily be made.

Infrared analysis indicated an Al—H band at 1800 cm.$^{-1}$.

Elemental chemical analysis gave C 24.6%; H 4.92%; Al 23.8%; F 37.0%. The theoretical values for a polymer having a monomeric unit of difluoroalane with 0.5 molecule of tetrahydrofuran associated therewith and corresponding to the empirical formula $AlHF_2 \cdot (C_4H_8O)_{0.5}$ is C 23.5%; H 4.94%; Al 26.42%; F 37.2%.

Example 3

Following the procedure described in Example 1, about 0.045 gram mole of bis(tetrahydrofuran)-chloroalane, $ClAlH_2 \cdot 2(C_4H_8O)$ was dissolved in 700 milliliters of tetrahydrofuran and reacted with 0.090 gram mole of hydrogen fluoride.

A clear, pale yellow solution was observed upon warming the reaction mixture to room temperature. This solution was filtered and the solvent removed under a reduced pressure. A pale yellow solid product was isolated.

This product was found by X-ray diffraction analysis to be amorphous.

This product slowly redissolved in tetrahydrofuran.

Molecular weight determinations carried out on a tetrahydrofuran solution indicated a degree of polymerization of about 6.

Elemental analysis of the solid product gave Al 14.68%; Cl 19.6%; F 19.5%; C 29.6%; H 5.19%. The theoretical analysis for a polymer having a monomeric unit of monochlorodifluoroalane with 1.13 molecules of tetrahydrofuran associated therewith and corresponding to the empirical formula, $AlClF_2 \cdot (C_4H_8O)_{1.13}$ are Al 14.83%; Cl 19.5%; F 20.9%; C 29.8%; H 4.97%.

Example 4

Following the general procedure set forth in Example 1, about 0.015 gram mole of di-n-amylphosphinic acid was dissolved in 300 milliliters of tetrahydrofuran and this solution added slowly to a cold (minus 70° C.) solution of aluminum hydride etherate (0.015 gram mole) in 1000 milliliters of tetrahydrofuran. After this addition was completed, about 0.035 gram mole of hydrogen fluoride was added. The reaction mixture was allowed to warm to room temperature over night (~18 hours) after which the reaction flask was attached to a reflux column and heated under refluxing solvent (67° C.) for 24 hours. A solid product was isolated by distilling off the solvent and drying the residue in a stream of nitrogen. High solubility of the product in tetrahydrofuran was evidenced since there was no precipitation of the product until substantially all of the solvent was removed from the reaction vessel.

The solid product was a clear, glassy, tan solid which was shown by X-ray diffraction analysis to be amorphous.

The product exhibited a low solubility in water and was relatively inert to concentrated nitric acid-sulfuric acid solutions.

Prolonged heating of the solid product produced embrittlement therein.

Elemental chemical analysis gave C 44.6%; H 8.38%; P 10.64%. The calculated theoretical values for a polymer having a monomeric unit of (di-n-amylphosphinato) difluoroalane corresponding to the empirical formula $[(C_5H_{11})_2PO_2AlF_2]$ are C 44.8%; H 8.21% and P 11.46%.

Example 5

Following the general procedure set forth in Example 1, about 0.01 gram mole of di-n-hexylphosphinic acid, ($C_6H_{13}$)$_2$P(O)OH, and 0.005 gram mole of di-n-dodecylphosphinic acid, ($C_{12}H_{25}$)$_2$P(O)OH, were dissolved in 300 milliliters of tetrahydrofuran and this solution slowly added to a cold (minus 70° C.) solution of aluminum hydride diethyletherate (0.015 gram mole) in 500 milliliters of tetrahydrofuran. To this phosphinic acid solution was added about 0.035 gram mole of hydrogen fluoride. The solution was warmed to room temperature overnight (~18 hours) and then was heated under reflux (67° C.) for an additional 24 hours.

A white, film-forming solid was recovered upon distillation of the solvent and drying of the residual product in a stream of nitrogen.

The product exhibited a high solubility in tetrahydrofuran and some solubility in toluene.

X-ray diffraction analysis indicated the film forming solid was crystalline at room temperature.

It fused between about 95–103° C.

Elemental chemical analysis gave C 54.35%; H, 9.88%. Calculated analysis for a (dialkylphosphinate)-difluoroalane polymer containing di-n-hexylphosphinic and di-n-dodecylphosphinic groups in 2:1 molar proportion is C 54.17%; H 9.66%.

Example 6

Following the procedure described in Example 5, a solution of 0.01 gram mole of di-n-hexylphosphinic acid and 0.025 gram mole of n-octylphosphonic acid in 250 milliliters of tetrahydrofuran was reacted with a solution of aluminum hydride diethyletherate (0.015 gram mole) in 600 milliliters of tetrahydrofuran. After five hours, about 0.035 gram mole of hydrogen fluoride was added to the reaction mixture.

After warming to room temperature and heating at reflux for 24 hours, a white solid product was recovered upon removal of the solvent. This material was dried in a stream of nitrogen.

X-ray diffraction analysis showed the product to be amorphous.

It was found to dissolve to some extent in tetrahydrofuran and in toluene.

The white solid fused at about 225° C.

Elemental chemical analysis showed C 44.65%; H 8.3%. Calculated theoretical analysis for the mixed polymer having a monomeric unit of n-octylphosphonate(di-n-hexylphosphinate)difluoroalane is C 44.47%; H 8.05%.

Example 7

Following the procedure set forth in Example 5, about 0.013 gram mole of n-octylphosphonic acid dissolved in 300 milliliters of tetrahydrofuran was reacted with 0.026 gram mole of aluminum hydride diethyl etherate dissolved in 900 milliliters of tetrahydrofuran and about 0.055 gram mole of hydrogen fluoride added thereto.

A pale yellow solid was recovered by removal of the solvent after the reflux operation.

This product was found by X-ray diffraction analysis to be amorphous before fusion, but crystalline after fusion.

The solid product was soluble in tetrahydrofuran; a molecular weight determination carried out on a tetrahydrofuran solution indicated a degree of polymerization ranging from about 21 to about 65.

The product upon heating fused below about 500° C.

Elemental chemical analysis gave C 36.95%; H 6.46%; Al 12.1%; P 7.55%. Calculated values for a polymer having a monomeric unit of bis(difluoroalano)n-octyl phosphonate, corresponding to the formula

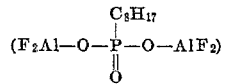

with 1.05 molecules of tetrahydrofuran associated therewith are C 36.82%; H 6.43%; Al 13.50%; P 7.78%.

Example 8

Following the procedure set forth in Example 5, about 0.020 gram mole of di-n-hexylphosphinic acid dissolved in 250 milliliters of tetrahydrofuran was reacted with ten milliliters of a heptane solution containing 0.020 gram mole of triethyl aluminum in 1000 milliliters of tetrahydrofuran. About 0.043 gram mole of hydrogen fluoride was added thereto.

A white solid was recovered by removal of the solvent after the reflux operation.

This product was found by X-ray diffraction analysis to be crystalline, and the same as a product prepared in a similar manner but using aluminum hydride etherate as the aluminum source.

The product fused at 240° C.

The solid product was soluble in tetrahydrofuran; a molecular weight determination carried out in a tetrahydrofuran solution indicated a degree of polymerization of about ten.

Elemental chemical analysis gave S 48.4%; H 8.55%; Al 8.86%. Calculated values for a polymer having a monomeric unit of (di - n - hexylphosphinato)difluoroalane corresponding to the empirical formula

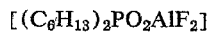

are C 49.5%; H 8.79%; Al 9.05%.

Example 9

Following the procedure described in Example 5, a solution of 0.01 gram mole of di-n-octyl phosphonic acid and 0.004 gram mole of di-n-dodecyl phosphonic acid in 250 milliliters of tetrahydrofuran was reacted with a solution of aluminum hydride diethyl etherate (0.028 gram mole) in 1000 ml. of tetrahydrofuran. After 30 minutes, about 0.058 gram mole of hydrogen fluoride was added to the reaction mixture.

The white solid was recovered by removal of the solvent after the reflux operation.

This product was found by X-ray diffraction analysis to be amorphous.

The solid product was soluble in tetrahydrofuran; a molecular weight determination carried out on a tetrahydrofuran solution indicated a degree of polymerization of about 95.

The product fused at about 400° C. (with some decomposition).

Elemental chemical analysis gave C 37.8%; H 6.78%; Al 11.07%; P 7.74%. Calculated values for a polymer having a monomeric unit corresponding to the formula

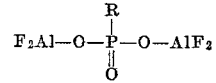

(wherein R is $C_8H_{17}$ or $C_{12}H_{25}$ in a ratio of

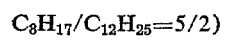

with 1.0 molecule of tetrahydrofuran associated therewith are C 38.4%; H 6.73%; Al 13.13%; P 7.54%.

Various modifications can be made in the present invention without departing from the spirit or scope thereof for it is understood that we limit ourselves only as defined in the appended claims.

We claim:
1. A method of preparing an aluminum-fluorine-aluminum linked inorganic polymer which comprises: reacting an aluminum source material with hydrogen fluoride in an inert solvent at a maximum temperature of about room temperature, said aluminum source material corresponding to the formula XAlR$_2$ wherein when X is phosphinate, phosphonate, halide or alkoxide having a total carbon content of from 1 to about 20, and R is either hydrogen or a saturated alkyl group having a total of from 1 to about 20 carbon atoms, and, separating a solid aluminum-fluorine-aluminum linked inorganic polymeric product from the residual reaction mass.

2. The process as defined in claim 1 wherein the reaction is carried out in an inert solvent at a maximum temperature of about 0° C.

3. The process as defined in claim 1 wherein the aluminum source material and hydrogen fluoride are employed in quantities such that the fluoride ranges from about 95 to about 105 weight percent of that required stoichiometrically for reaction with the R groups of said aluminum source material.

4. The process as defined in claim 1 wherein the aluminum source material and hydrogen fluoride are employed in about stoichiometric quantities required for reaction with the R groups of said aluminum source material.

5. A solid aluminum-fluorine-aluminum linked inorganic polymer, comprising at least 6 monomeric units corresponding to the formula $XAlF_2$ wherein X is halogen hydrogen, phosphinate, phosphonate, or alkoxide having a total carbon content of from 1 to about 20.

6. A process as in claim 1 wherein the solvent is tetrahydrofuran.

7. The polymer of claim 5 wherein the polymerized difluoroalane monomeric units are associated with molecules of an inert solvent employed in preparing the polymers.

8. The polymer of claim 7 wherein the associated solvent is tetrahydrofuran.

9. A method comprising reacting etherated aluminum hydride with hydrogen fluoride in an inert solvent at a maximum temperature of about room temperature, and separating a solid aluminum-fluorine-aluminum linked inorganic polymeric product from the residual reaction mass.

References Cited

UNITED STATES PATENTS 3,306,924  2/1967  Moretti et al.

OTHER REFERENCES

"Chemical Abstracts," vol. 57, p. 987, July 1962.

OSCAR R. VERTIZ, Primary Examiner

G. O. PETERS, Assistant Examiner

U.S. Cl. X.R.

23—88, 367; 260—448